Oct. 4, 1938.  D. T. BROCK ET AL  2,131,933
FUEL INJECTION PUMP
Filed Oct. 5, 1936   3 Sheets-Sheet 1

INVENTORS
D. T. Brock.
G. J. Trapp.
By Lacey & Lacey
Attys.

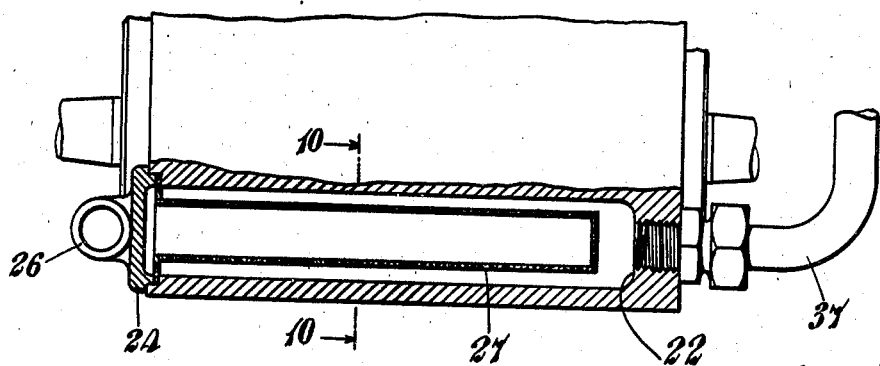
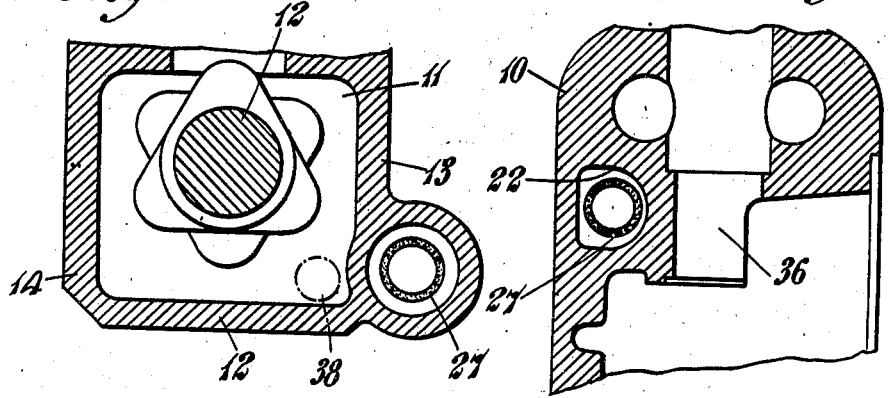
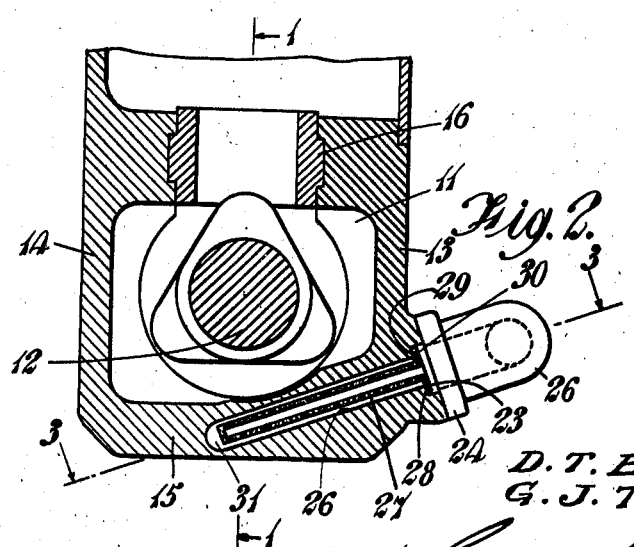

Oct. 4, 1938.   D. T. BROCK ET AL   2,131,933
FUEL INJECTION PUMP
Filed Oct. 5, 1936   3 Sheets-Sheet 3
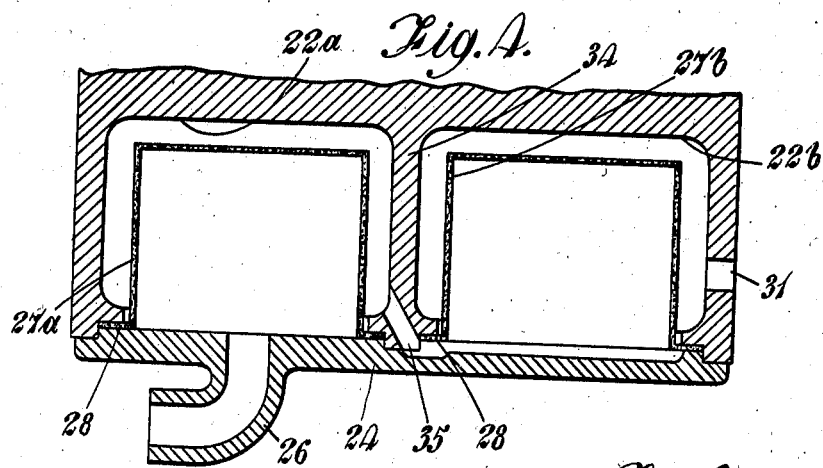
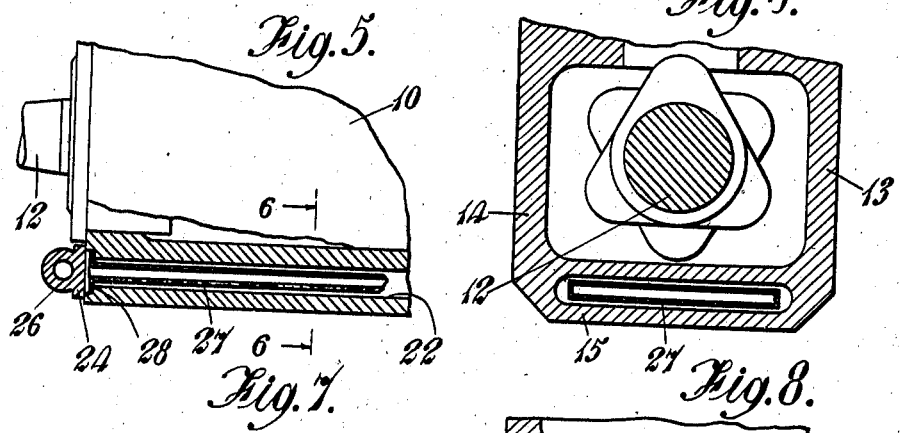
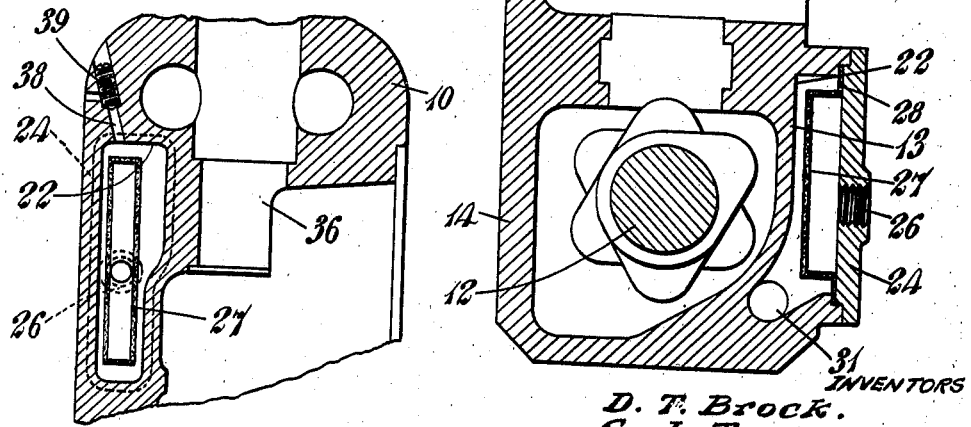
INVENTORS
D. T. Brock.
G. J. Trapp.
By Lacey & Lacey
ATTYS.

Patented Oct. 4, 1938

2,131,933

UNITED STATES PATENT OFFICE 2,131,933

FUEL INJECTION PUMP

Denis Tabor Brock and George Joseph Trapp, London, England, assignors to Automotive Products Company Limited, London, England Application October 5, 1936, Serial No. 104,112
In Great Britain October 4, 1935

1 Claim. (Cl. 103—154)

(Granted under the provisions of sec. 14, act of March 2, 1927; 357 O. G. 5)

This invention relates to liquid injection pumps, such for example as those which are normally used in the fuel supply systems of internal combustion engines of the Diesel type, in which a pump unit having one or more cylinders disposed in line and in parallel relationship one to another is adapted to deliver liquid fuel to the respective engine cylinders.

It is the object of the present invention to provide an improved construction of pump unit which incorporates filtering means in a compact and convenient manner, and also to provide improved methods of filtering in injection pump units.

The invention accordingly provides a liquid injection pump in which the pump body is formed with a filter chamber having inlet and outlet passages, said chamber being occupied by a filter device operatively interposed between said inlet and outlet passages. In a pump which is actuated by a cam shaft disposed within a cam shaft casing, one wall at least of said cam shaft casing may be itself hollow for the accommodation of a filter device through which liquid is passed prior to entering into the injection cylinder or cylinders, said filter device conveniently being flat or plate-like in form and being disposed beneath the usual cam shaft chamber.

The invention further provides in a liquid injection pump having a plurality of injection cylinders within a pump body, said cylinders being arranged parallel with one another and in a common plane, a filter chamber which is formed integrally in the pump body and is elongated in form so that it extends for substantially the whole length of said body and in a direction parallel with the aforesaid common plane.

A liquid injection pump is further provided having a metal body which is formed in one piece with a filter chamber containing a filter device comprising a receptacle composed of filtering material, said chamber being formed with an inlet opening communicating with the interior of the filter device and a delivery opening for receiving liquid which has passed through said device. The improved filter device according to the invention preferably extends for substantially the whole length of the pump body measured parallel with the usual driving spindle of the pump. A plurality of separate filtering devices may, of course, be provided and these may be arranged in series, so that the liquid passing through the first is led into the second and so on. Moreover, in the preferred construction the lower wall of the cam shaft casing of the injection pump is hollow to provide a filter compartment which is flat in shape and which opens into one side of the pump, this opening being closed normally by an elongated cover and serving for the insertion and removal of the filter device. With this arrangement a pair of chambers may conveniently be formed side by side for the reception of a pair of filter devices, an inter-communicating passage being formed to connect the exterior of one filter device with the interior of the other. Not only does the invention improve the utility of an injection pump unit but it also simplifies the construction where a filter is to be used, as it enables external connecting pipes between the filter and the normal inlet of the pump to be entirely dispensed with, suitable passages being formed in the body of the pump for conducting the liquid from the filter or filters to the injection pump inlet or to the feed pump, where such pump is employed.

The invention is illustrated by the various examples given in the accompanying diagrammatic drawings in which:

Figure 2 is a fragmentary section on the line 2—2 of Figure 1;

Figure 4 is a view corresponding to Figure 3, but showing an arrangement in which two filters are used in series;

Figure 5 is a fragmentary side elevation partly in section showing a form of filter removable from the end of the pump unit;

Figure 6 is a sectional elevation on the line 6—6 of Figure 5;

Figure 7 is a sectional end elevation showing a further location for the filter device, which latter is also removable from the end of the pump unit;

Figure 8 is a sectional end elevation showing a construction in which the filter device is removable from the side of the pump unit;

Figure 9 is a sectional side elevation of a further arrangement utilising a cylindrical filter device removable from the end of the pump unit;

Figure 10 is a sectional elevation on the line 10—10 of Figure 9; and

Figure 11 is a sectional end elevation showing a still further position for the filter device.

Figure 1:
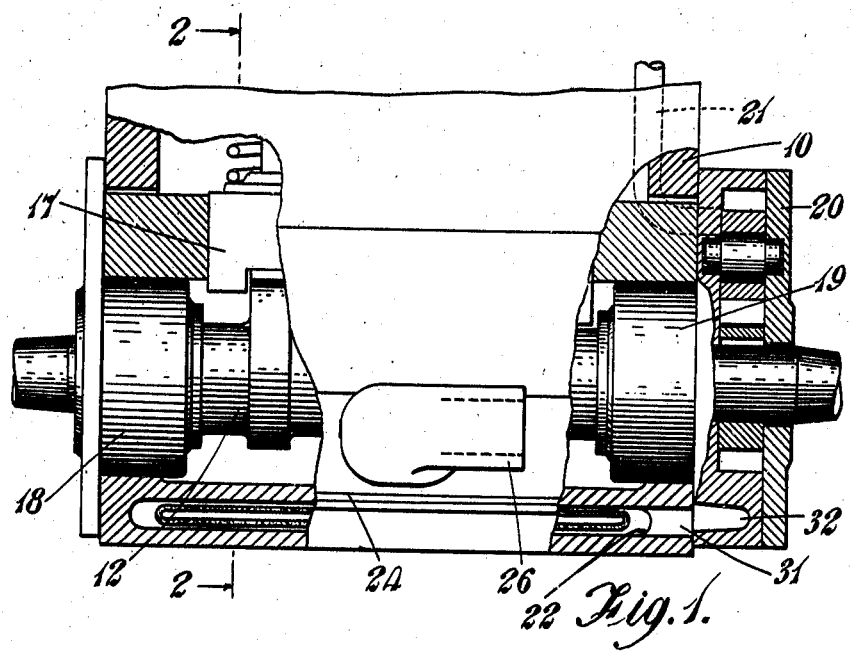
Figure 1 is a fragmentary side elevation of an injection pump unit partly in section on the line 1—1 of Figure 2.
Figure 3:
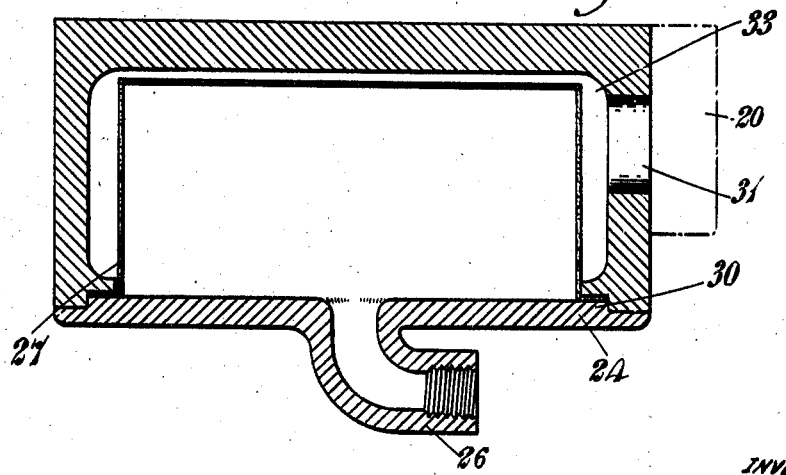
Figure 3 is a sectional plan on the line 3—3 of Figure 2.

Referring firstly to Figures 1, 2 and 3 a multi-cylinder injection pump unit is shown comprising a metal casting 10 forming the body of the pump, the lower part of said casting being arranged to form a housing 11 for a cam shaft, indicated at 12, said housing comprising a pair of side walls 13 and 14 and a bottom 15. The upper part of the cam shaft housing 11 is provided with any suitable tappet guide 16 for receiving the usual tappets, one of which is indicated at 17 in Figure 1, while the cam shaft 12 is provided with a pair of bearings indicated generally at 18 and 19 respectively. As is usual, the injection cylinders (not shown) are arranged vertically in line with their axes lying in a common plane which contains the axis of the cam shaft 12, said plane coinciding with the line 1—1 in Figure 2.

At one end of the pump and driven by the cam shaft 12 is a feed pump 20 of any suitable form, adapted in the case illustrated to receive liquid from the filter, as will be hereinafter explained, and deliver it through the pipe 21 to the usual inlet passage serving the injection cylinders.

In accordance with the present invention the bottom 15 of the cam shaft casing 11 is hollow and is formed with a substantially flat chamber 22 extending for the whole length of the pump unit as shown in Figure 1. This chamber is so disposed that its mouth 23 extends along the side of the pump unit, and is inclined upwardly in relation to the innermost part of the chamber 22, said mouth being closed normally by an elongated cover plate 24 which is formed integrally with an inlet pipe fitting 26 adapted to be connected with a reservoir or other convenient source of liquid (not shown). The chamber 22 contains a filter device 27 which takes the form of a flat plate-like receptacle provided at its mouth with a flange 28 which is normally held in firm contact with a shoulder 29 by means of a projection 30 formed upon the interior of the cover plate 24. The inner part of the chamber 22 is provided with a longitudinally extending passage 31 which communicates with the inlet passage 32 of the feed pump 20. The liquid therefore, after reaching the interior of the filter device 27 by way of the inlet pipe 26, passes through the wall of said device into the surrounding space 33, and thence passes through the passage 31 into the feed pump 20, as will be seen in Figure 3.

It will thus be seen that the filter chamber 22 which is formed integrally in the pump body 10, extends for substantially the whole length of the latter and has its longitudinal axis lying parallel with the above mentioned general plane containing the axes of the injection cylinders and indicated at 1—1 in Figure 2, said longitudinal axis also being parallel with the axis of the cam shaft 12.

A slight modification is shown in Figure 4, in which a partition 34 divides the chamber into two parts indicated at 22a and 22b these having a common cover plate 24, which not only serves to close the two mouths of the chambers 22a and 22b but also holds in place a pair of filter devices 27a and 27b. The inlet pipe 26 feeds liquid into the interior of the filter device 27a, and after passing through the wall of the device said liquid flows through a passage 35 connecting the outside of the filter device 27a with the inside of the filter device 27b. The liquid thereafter has to pass through the wall of the device 27b and escapes from the chamber through the passage 31 conveniently leading to the feed pump or to the injection cylinders of the pump unit. In this case, of course, the two chambers 22a and 22b are substantially flat so as to occupy very little space in the bottom 15 of the injection pump body, and they may, if desired, be inclined in the manner shown in Figure 2 or may be arranged so that their general plane is level.

Figures 5 and 6 illustrate an arrangement in which the chamber 22 has its mouth at one end of the pump body 10, a cover plate 24 incorporating an inlet pipe 26 again being provided. In this case the flange 28 is provided upon the end of the filter device 27, while the outlet passage (not shown) from the chamber 22 is preferably formed at the end opposite to the cover plate 24. It will be seen from Figure 5 that the filter extends parallel with the axis of the cam shaft 12. A slight modification is shown in Figure 7 where the filter device 27 is similar to that shown in Figures 5 and 6, but is accommodated within a chamber 22 formed alongside the injection cylinders, which latter are not shown, although the bore for the accommodation of one of the cylinder assemblies is indicated at 36. As before the longitudinal axis of the filter device 27 lies parallel with the common plane containing the axes of the injection cylinders and the chamber 22 reaches from end to end of the body casting of the pump unit. If desired, an air relief passage 38 having a screw plug 39 may lead from the highest part of the chamber 22 so as to enable air to be readily removed when the pump is being charged with liquid.

A somewhat modified form of filter device 27 is employed in the arrangement shown in Figure 8, said device being in the form of a substantially shallow tray which is provided around its periphery with a flange 28 as before. The chamber 22 is also comparatively shallow and is provided with an outlet passage 31 taking the liquid which passes through the filter device 27.

Referring to Figures 9 and 10, the filter device 27 is in this case elongated, and is circular in cross-section, the cover plate 24 being made circular to correspond and being fitted with an inlet passage 26. After passing through the filter device 27 the liquid is delivered through a pipe 37 for use where required in the feed pump or injection cylinders. For the accommodation of the filter device 27 the wall 13 of the cam shaft chamber 11 is bulged as shown in Figure 10, although in some cases, of course, a filter of this general form can easily be accommodated in the corner of the cam shaft chamber, is indicated by the circle 38 shown in broken lines. In Figure 11 the same sort of cylindrical filter device 27 is accommodated within a chamber 22 formed in the body 10 alongside the injection cylinders in the same manner as the embodiment illustrated in Figure 7.

Means other than that described may, of course, be used for accommodating and securing the flat filter elements in proximity to the cam shaft chamber, and, if desired, said elements may be arranged to be withdrawn in a longitudinal direction from either end of the injection pump unit. The filter chamber may, moreover be disposed in a substantially vertical plane alongside the front or rear side of the injection pump unit, said element again being disposed in a plane lying substantially parallel with the usual cam shaft.

It will be understood that the actual filtering means may be of any known or suitable kind, and may for example consist of wire gauze, wire or fabric cloth, or alternatively special forms of filter may be employed, such as those comprising metal plates or other members held in spaced relationship so as to produce an edge filtering effect. The flat construction of filter moreover may permit the use of elements similar in construction to the usual filter press, in which cloth filtering members are interspaced with rigid supporting plates or equivalent. The filtering means may, of course, be connected in any desired part of the passage traversed by the fuel oil or equivalent liquid to be handled by the injection pump, and in cases where the base portion of the injection pump unit is arranged to accommodate a plurality of filtering elements these can be connected independently with different parts of said passage.

What we claim is:

In a multi-cylinder fuel injection pump unit having plungers arranged in line and actuated from below by a horizontal cam shaft disposed within a cam shaft casing, a feed pump driven by the cam shaft, a hollow wall which forms the bottom of the cam shaft casing, the space within said wall serving as a filter-chamber and being formed with an elongated opening to the exterior, said opening extending along the pump body parallel with the cam shaft, an elongated cover closing said opening, a hollow filter element which is elongated and flat in shape disposed within said filter chamber with its mouth portion in register with the elongated opening and with its general plane inclined to the horizontal in order to facilitate the removal of said filter element, a passage for liquid fuel leading through said cover into the interior of the filter element, and a passage from the filter chamber to the usual inlet ports of the feed pump.

DENIS TABOR BROCK.
GEORGE JOSEPH TRAPP.